United States Patent
Yamazaki

(10) Patent No.: US 10,885,325 B2
(45) Date of Patent: Jan. 5, 2021

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Taeko Yamazaki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 249 days.

(21) Appl. No.: 15/877,062

(22) Filed: Jan. 22, 2018

(65) Prior Publication Data

US 2018/0232573 A1 Aug. 16, 2018

(30) Foreign Application Priority Data

Feb. 10, 2017 (JP) ................................ 2017-023558

(51) Int. Cl.
G06K 9/00 (2006.01)
G06K 9/20 (2006.01)

(52) U.S. Cl.
CPC ..... *G06K 9/00463* (2013.01); *G06K 9/00449* (2013.01); *G06K 9/2063* (2013.01); *G06K 9/2081* (2013.01); *G06K 2209/01* (2013.01)

(58) Field of Classification Search
None
See application file for complete search history.

(56) References Cited

U.S. PATENT DOCUMENTS 5,228,100 A * 7/1993 Takeda .................. G06F 17/243
382/175
2013/0077863 A1* 3/2013 McCombs ......... G06K 9/00469
382/176

FOREIGN PATENT DOCUMENTS

JP 2009-093305 4/2009
JP 2010-217996 9/2010

OTHER PUBLICATIONS

Mista et al. (A System for Automated Extraction of Metadata from Scanned Documents using Layout Recognition and String Pattern Search Models, PMC Dec. 20, 2010). (Year: 2010).*

* cited by examiner

*Primary Examiner* — Randolph I Chu
(74) *Attorney, Agent, or Firm* — Venable LLP

(57) ABSTRACT

An information processing apparatus extracts an area by performing an area analysis on an image, acquires a rule that defines a keyword and conditions of a value corresponding to the keyword, determines an order of specifying an area including the keyword and an area including the value corresponding to the keyword based on the acquired rule, firstly specifies the area including the keyword or the area including the value corresponding to the keyword from among the extracted area in accordance with the determined order, performs character recognition processing on the specified area, and secondly specifies the corresponding another area based on the acquired rule and the first specified area.

9 Claims, 10 Drawing Sheets

Slip number 1234-C56

Diagnostic fee statement

Full name  CHOHYO Taro

Injury or illness name  Right foot sprain

| Medical treatment contents | Physical examination | 4,000 yen |
| Inspection agent  3,000 yen | Hospitalization other | 13,000 yen |
| Subtotal  3,000 yen | | |

Total ￥20,000

302

Diagnostic fee statement

Number 7890-D12            Name  CHOHYO Taro

| Medicine A  1,000 yen | Physical examination  4,000 yen |
| Medicine B  2,000 yen | Hospitalization other  13,000 yen |
| Subtotal  3,000 yen | |

Total 20,000 yen

FIG. 4

```
               Please fill extraction rule

Keyword                    | Full name, Name, Patient's name |

Character type of value    | Alphabet |

Character string length
of value                   | Undefined |

Position value is in              | Right ▽ |  | 30 pixel ▽ |

| Cancel |  | Store and End |  | Input next condition |
```

FIG. 5

| Rule | Keyword | Direction | Distance | Charactor type of value | Character string length of value |
|---|---|---|---|---|---|
| Rule 1 | Full name<br>Name<br>Patient's name | Right | 30pixel | Alphabet | Undefined |
| Rule 2 | Total<br>Total sum | Right | 15pixel | 0-9<br>"¥"<br>"yen"<br>"." | 10 digits or less |
| Rule 3 | Slip number<br>Number<br>Form number<br>File ID | Right | 20pixel | 0-9<br>"-"<br>"A"<br>"B"<br>"C" | 7 digits (fixed) |

FIG. 8

| ID | Upper left coordinates | Width | Height | Character recognition result |
|---|---|---|---|---|
| 1 | (8,16) | 65 | 19 | |
| 2 | (121,16) | 130 | 19 | |
| 3 | (141, 52) | 185 | 25 | |
| 4 | (16, 121) | 47 | 24 | |
| 5 | (122, 121) | 104 | 25 | |
| 6 | (14, 159) | 65 | 22 | |
| 7 | (98, 159) | 90 | 22 | |
| 8 | (28, 228) | 90 | 22 | |
| 9 | (227, 288) | 45 | 22 | |
| 10 | (370, 230) | 66 | 19 | |
| 11 | (28, 259) | 89 | 22 | |
| 12 | (140, 261) | 66 | 19 | |
| 13 | (228, 259) | 115 | 21 | |
| 14 | (361, 261) | 77 | 19 | |
| 15 | (28, 289) | 44 | 21 | |
| 16 | (136, 291) | 66 | 19 | |
| 17 | (253, 555) | 51 | 24 | |
| 18 | (323, 557) | 91 | 22 | |

FIG. 10

| Rule | Keyword | Direction | Distance | Charactor type of value | Character string length of value | Estimation order in rule | Estimation order in table |
|---|---|---|---|---|---|---|---|
| Rule 1 | Full name<br>Name<br>Patient's name | Right | 30pixel | Japanese | Undefined | Keyword | Low |
| Rule 2 | Total<br>Total sum | Right | 15pixel | 0-9<br>"￥"<br>"yen"<br>"." | 10 digits or less | Value | Intermediate |
| Rule 3 | Slip number<br>Number<br>Form number<br>File ID | Right | 20pixel | 0-9<br>"-"<br>"A"<br>"B"<br>"C" | 7 digits (fixed) | Value | High |

FIG. 11

| ID | Upper left coordinates | Width | Height | Character recognition result |
|---|---|---|---|---|
| 1 | (8,16) | 65 | 19 | |
| 2 | (121,16) | 130 | 19 | 1234-C56 |
| 3 | (141, 52) | 185 | 25 | |
| 4 | (16, 121) | 47 | 24 | |
| 5 | (122, 121) | 104 | 25 | |
| 6 | (14, 159) | 65 | 22 | |
| 7 | (98, 159) | 90 | 22 | |
| 8 | (28, 228) | 90 | 22 | |
| 9 | (227, 288) | 45 | 22 | |
| 10 | (370, 230) | 66 | 19 | |
| 11 | (28, 259) | 89 | 22 | |
| 12 | (140, 261) | 66 | 19 | |
| 13 | (228, 259) | 115 | 21 | |
| 14 | (361, 261) | 77 | 19 | |
| 15 | (28, 289) | 44 | 21 | |
| 16 | (136, 291) | 66 | 19 | |
| 17 | (253, 555) | 51 | 24 | |
| 18 | (323, 557) | 91 | 22 | |

FIG. 12

| ID | Upper left coordinates | Width | Height | Character recognition result |
|---|---|---|---|---|
| 1 | (8,16) | 65 | 19 | Slip number |
| 2 | (121,16) | 130 | 19 | 1234-C56 |
| 3 | (141, 52) | 185 | 25 | |
| 4 | (16, 121) | 47 | 24 | |
| 5 | (122, 121) | 104 | 25 | |
| 6 | (14, 159) | 65 | 22 | |
| 7 | (98, 159) | 90 | 22 | |
| 8 | (28, 228) | 90 | 22 | |
| 9 | (227, 288) | 45 | 22 | |
| 10 | (370, 230) | 66 | 19 | |
| 11 | (28, 259) | 89 | 22 | |
| 12 | (140, 261) | 66 | 19 | |
| 13 | (228, 259) | 115 | 21 | |
| 14 | (361, 261) | 77 | 19 | |
| 15 | (28, 289) | 44 | 21 | |
| 16 | (136, 291) | 66 | 19 | |
| 17 | (253, 555) | 51 | 24 | |
| 18 | (323, 557) | 91 | 22 | |

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a storage medium.

Description of the Related Art

There is a system which extracts information by specifying an area in which information such as a name or a total fee included in a scanned form image is written in such an image and performing character recognition processing on the specified area. Such a system determines an area on which the character recognition processing is performed based on coordinates in an image when processing a form in which an area in which information to be extracted such as a name or a total fee is written is in a fixed position. However, in processing of an undefined form in which the area in which the information to be extracted such as the name or the total fee is written is not in a fixed position (a form whose format is unknown), the information cannot be extracted using the above-described method.

Japanese Patent Laid-Open No. 2009-93305 discloses a form recognition apparatus in which only a character string located in the uppermost row, the lowest row, or the leftmost column in a table area of a form is subjected to item name area detection processing. Furthermore, Japanese Patent Laid-Open No. 2010-217996 discloses a character recognition apparatus which performs specific character recognition processing for recognizing only specific characters centering on alphanumeric characters and all-character recognition processing for recognizing all characters in a re-recognition target determined to require re-recognition as a result of the specific character recognition processing.

However, in Japanese Patent Laid-Open No. 2009-93305, a table area surround by a ruled line is subjected to item name area detection processing, and the item name area detection process cannot be applied to an area other than the table or an area having no vertical and horizontal alignment of a frame including a character string. In Japanese Patent Laid-Open No. 2010-217996, since specific character recognition processing is performed on the entire image, and it is necessary to perform the character recognition processing twice on a target determined to require re-recognition as a result of the specific character recognition processing, it takes time to perform such processing.

SUMMARY OF THE INVENTION

An objective of the present invention is to provide an information processing apparatus which efficiently and quickly extracts information using character recognition processing from an image with a format for which the positions in which information is written are not known.

An information processing apparatus according to an embodiment of the present invention includes: a memory for storing a computer program; and a processor for executing the computer program to perform: extracting an area by performing area analysis processing on an image; acquiring a rule that defines a keyword and conditions of a value corresponding to the keyword; determining an order for specifying an area including the keyword and an area including the value corresponding to the keyword based on the acquired rule; first specifying the area including the keyword or the area including the value corresponding to the keyword from among the extracted area in accordance with the determined order; character recognition processing on the specified area; and second specifying the corresponding another area based on the acquired rule and the first specified area.

Further features of the present invention will become apparent from the following description of exemplary embodiments with reference to the attached drawings.

BRIEF DESCRIPTION OF THE DRAWINGS

FIG. 3 is a diagram illustrating an example of a scanned image.

FIG. 4 is a diagram illustrating an example of a screen configured to input a keyword and a value condition.

FIG. 5 is a diagram showing a data structure of a rule table.

FIG. 8 is a diagram showing an area information table data structure.

FIG. 10 is a diagram showing a rule table when the processing of FIG. 9 ends.

FIG. 11 is a diagram showing an area information table in a state in which the result of character recognition processing is included.

FIG. 12 is a diagram showing an area information table in a state in which the result of character recognition processing is included.

DESCRIPTION OF THE EMBODIMENTS

Embodiments for carrying out the present invention will be described below with reference to the drawings and the like.

First Embodiment

Figure 1:
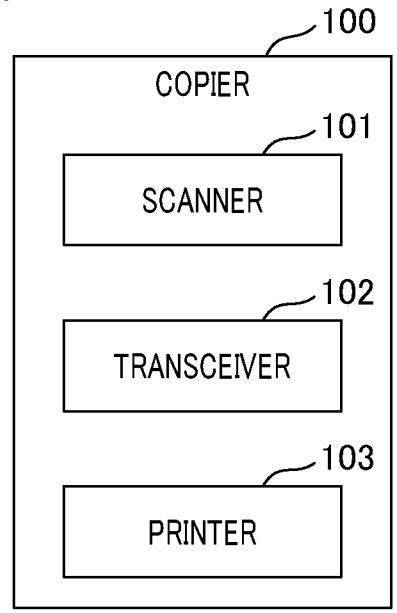
FIG. 1 is a diagram showing a configuration of a copier.

FIG. 1 is a diagram showing a configuration of a copier 100 according to this embodiment.

The copier 100 includes a scanner 101, a transceiver 102, and a printer 103.

Figure 2:
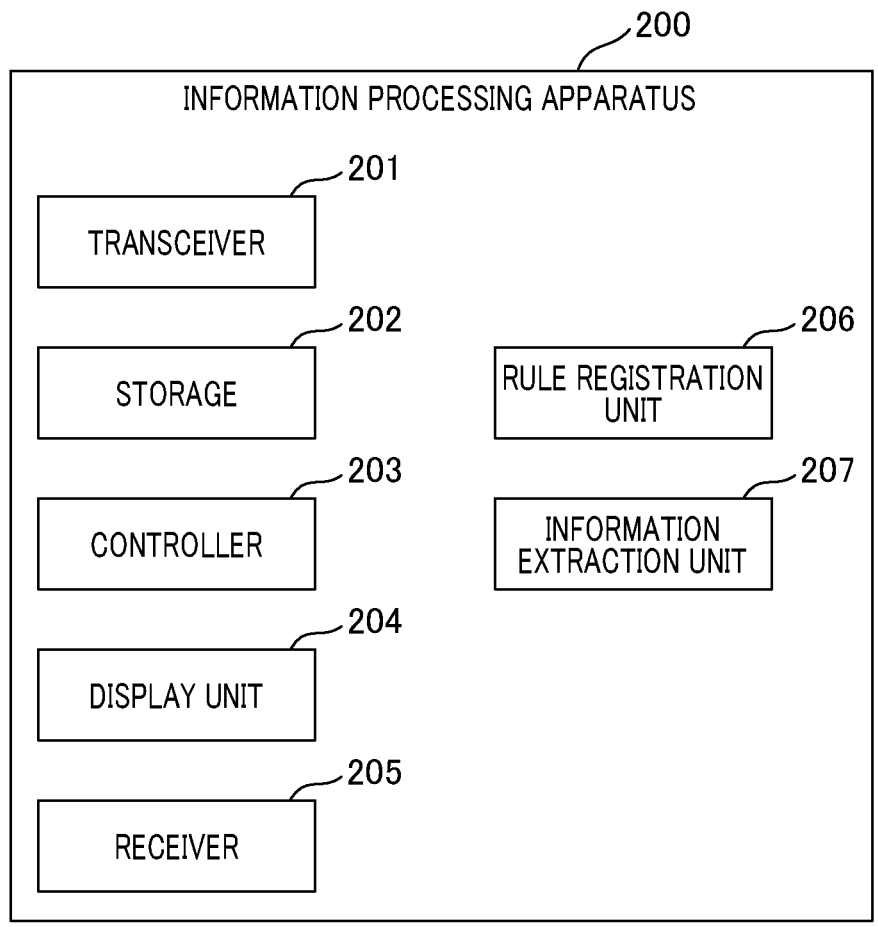
FIG. 2 is a diagram showing a configuration of an information processing apparatus.

FIG. 2 is a diagram showing a configuration of an information processing apparatus 200 according to the embodiment.

The information processing apparatus 200 includes a transceiver 201, a storage 202, a controller 203, a display unit 204, a receiver 205, a rule registration unit 206, and an information extraction unit 207. Furthermore, the information processing apparatus 200 includes a central processing unit (CPU), a read only memory (ROM), and a read access memory (RAM), which are not shown, therein. The CPU loads a program of the information processing apparatus 200 from the ROM and executes the program of the information processing apparatus 200 using the RAM as a primary storage area. With the above operation, the processing of each unit shown in FIG. 2 is executed.

Note that the receiver 205 is generally in a form including a keyboard and a mouse, but the present invention is not limited to such a form. Furthermore, the receiver 205 and the display unit 204 may be integrally formed. In this case, the receiver 205 and the display unit 204 are collectively referred to as a touch panel. Furthermore, the display unit 204 may be in a form in which an image is projected by a projector and the receiver 205 may be in a form in which a fingertip position of the projected image is recognized by a camera.

FIG. 3 illustrates an example of a scanned image obtained by scanning a document using a scanner.

Although a scanned image of a non-fixed form will be described as an example in the embodiment, the present invention is not limited thereto, and the present invention can also be applied to any scanned image of a document other than a form. Furthermore, the present invention can also be applied not only to a scanned image, but also to, for example, an image photographed by a camera.

A non-fixed form is a form in which a position in which information included in the form is written is not fixed. In other words, a non-fixed form is a form in which a format of a position in which information is written is unknown. For example, in a form 301 and a form 302 illustrated in FIG. 3, a position in which information indicating a name, that is, a character string "form Taro" is written is different.

For example, when information indicating a name is extracted from a non-fixed form, an area including a character string serving as a keyword such as "name" or "full name" is specified. Moreover, information indicating a name is assumed to be written in an area at a position in a predetermined direction with respect to the character string and character recognition processing is considered to be performed on the area at the position in the predetermined direction. However, in this case, since character recognition processing is performed on the entire form and an area in which information indicating a name is written is specified using the result, it takes time to perform such a process.

On the other hand, in the embodiment, an area which is easy to specify of areas including a keyword or a value on the basis of the keyword and value conditions is determined and then information is extracted by performing character recognition processing on the area. The keyword and value conditions are input by a user via the receiver 205 and stored in the rule registration unit 206. Details will be described with reference to FIG. 4.

In the embodiment, an item name of information to be extracted, that is, a character string serving as a marker, is referred to as a keyword, and the information to be extracted is referred to as a value. For example, in the form 301 or the form 302 shown in FIG. 3, "name" or "full name" is the item name of the value and the character string (keyword) serving as a marker with respect to "form Taro" serving as the information (value) indicating the name. Furthermore, in the form, an area in which the keyword is written is referred to as a keyword area, and an area in which the value is written is referred to as a value area.

FIG. 4 is a diagram illustrating an example of a user interface used when the user inputs keyword and value conditions.

The user interface shown in FIG. 4 is displayed on the display unit 204 using the rule registration unit 206. In the user interface shown in FIG. 4, the user inputs a character string serving as a keyword of information to be extracted and a condition of information to be extracted, that is, a value.

A plurality of words can be registered as keywords in consideration of notation fluctuation in the form. For example, in an example illustrated in FIG. 4, "full name", "name", and "patient's name" are registered as values from which keywords can be acquired. In other words, the information to be extracted is information (a value) corresponding to any of "full name", "name", and "patient's name". In the value condition, a position in which a value corresponding to a keyword is written and a value from which a value can be acquired are registered.

For example, in the example illustrated in FIG. 4, the value is set to be arranged "30" pixels "right" of the keyword. In addition, in the example illustrated in FIG. 4, it is set as the value condition that a character type is Alphabet and a character string length is undefined. The character type is a character type such as Alphabet, numbers, symbols, Chinese characters, and Japanese characters. Note that the keyword and the value condition used to extract information illustrated in FIG. 4 are an example, and the present invention is not limited thereto. The rule registration unit 206 stores the keyword and value conditions input by the user in the storage 202 as a rule table.

FIG. 5 is a schematic diagram of data stored in the storage 202 as the rule table by the rule registration unit 206.

In the embodiment, a condition that information be extracted from a form is referred to as a rule, and data in which the rule is defined as a plurality of sets is referred to as a rule table. Rule 1 is a rule in which the keyword and value conditions input in the user interface shown in FIG. 4 are stored.

Rule 2 is a rule in which a keyword is "Total" or "Total sum" and an area located at a position of 15 pixels to the right with respect to the keyword is set as an area in which a value is written. Furthermore, in Rule 2, the value is constituted of numbers 0 to 9 and a character "¥", "yen", or "." and a character string length is set to be 10 characters or less. Rule 3 is a rule in which a keyword is any of "Slip number", "Number", "Form number", and "File ID" and an area located at a position of 20 pixels to the right with respect to the keyword is set as an area in which a value is written. Furthermore, in Rule 3, the value is constituted of numbers 0 to 9 and a character "-", "A", "B", or "C" and a character string length is set to be 7 characters.

A process performed in the embodiment will be described below. When a scanner 101 of the copier 100 scans a document, a scanned image is generated. The transceiver 102 transmits the generated scanned image to the information processing apparatus 200. Then, the transceiver 201 of the information processing apparatus 200 receives the scanned image and stores the scanned image in the storage 202.

Figure 6:
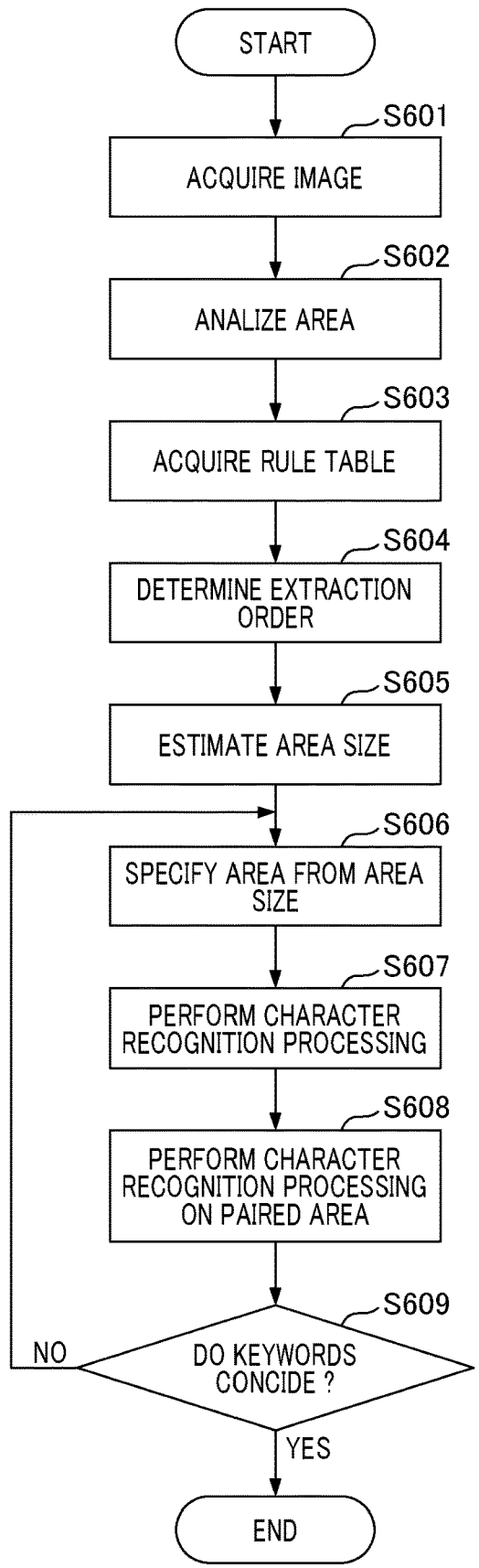
FIG. 6 is a flowchart for describing a process of extracting information from a scanned image.

FIG. 6 is a flowchart for describing a process in which the information processing apparatus 200 extracts information from a scanned image.

In Step S601, the information extraction unit 207 included in the information processing apparatus 200 acquires the scanned image stored in the storage 202. In Step S602, the information extraction unit 207 performs area analysis processing on the acquired scanned image. In the area analysis processing, areas of attributes such as a character string, an image, and a graph are determined by analyzing the scanned image. In the embodiment, it is assumed that each area is determined as a rectangular area.

Figure 7:
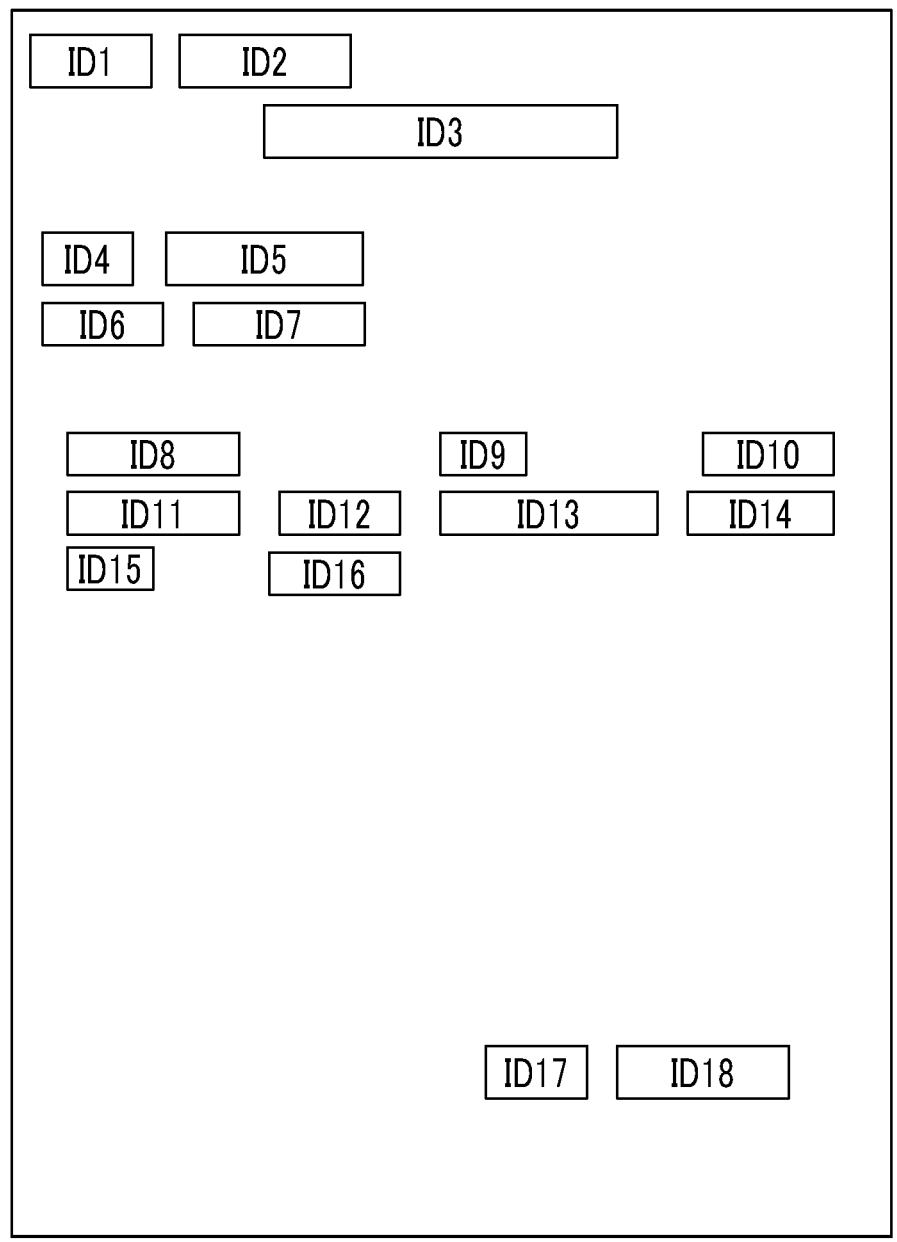
FIG. 7 is a diagram illustrating an example of the result of area analysis processing.

FIG. 7 is a diagram in which the result of performing the area analysis processing on the form 301 illustrated in FIG. 3 is visualized.

The attribute of the rectangular area is a character string, an image, a graph, or the like. In the embodiment, as a result of the area analysis processing, information is extracted using an area in which the attribute is specified as a character string. A known method may be used as the area analysis processing. The information extraction unit 207 stores the result of performing the area analysis processing in the storage 202 as an area information table.

FIG. 8 is a schematic diagram of data stored in the storage 202 as an area information table by the information extraction unit 207.

The area information table includes an identification (ID) for uniquely identifying the rectangular area in the scanned image, an upper left coordinate, a width, and a height serving as coordinate information in the scanned image of the rectangular area, and the result of performing character recognition processing on the rectangular area. A coordinate value is a pixel value when the upper left of the scanned image is set as the origin, a horizontal direction is set as an X axis, and a vertical direction is set as a Y axis.

An ID of the area extracted as a result of the area analysis processing illustrated in FIG. 7 corresponds to an ID of the rectangular area illustrated in FIG. 8. Since the character recognition processing has not yet been performed at the time of Step S602, a character recognition result of the area information table is empty. When the character recognition processing is performed in Step S607 which will be described below, the result is written in a column of an area corresponding to the character recognition result of the area information table.

Description will return to FIG. 6. In Step S603, the information extraction unit 207 acquires the rule table stored in the storage 202 by the rule registration unit 206. In Step S604, the information extraction unit 207 determines the order of estimating an area from which information is extracted. In other words, the information extraction unit 207 determines specific content of a used rule among rules included in the rule table and a used order used to estimate an area in which information to be extracted is written.

Specifically, the specific content of the used rule among the rules included in the rule table used to estimate the area and previously used specific content between the keyword and value conditions in one rule used to estimate the area are determined.

For example, since it is easier to estimate an area in which notation fluctuation is small and a fixed value is written as a character string length as compared with an area in which a keyword is written, information can be extracted with high accuracy at a high speed. In this way, an order in which any of the keyword and value conditions is first used is determined on the basis of a value from which a keyword and a value are acquired in one rule.

Also, for example, information can be extracted with high accuracy at a high speed from an area in which a character type can be limited by performing the character recognition processing. In this way, when a plurality of rules are included in the rule table, specific content of an order of using rules is determined on the basis of the value from which the keyword and the value can be acquired. Details of a process of Step S604 will be described with reference to FIG. 9.

Figure 9:
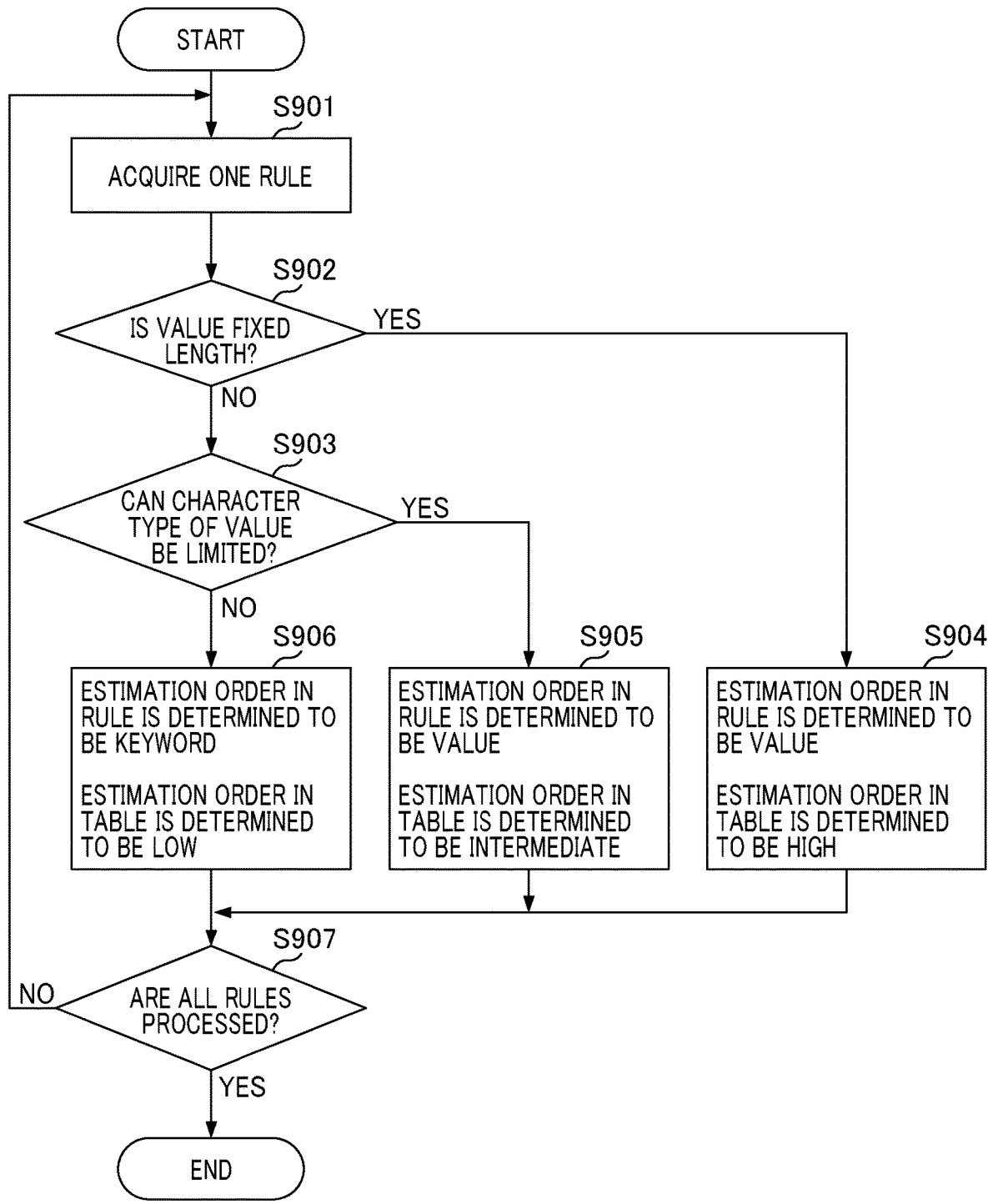
FIG. 9 is a diagram showing a process of determining an order of estimating an area from which information is extracted.

FIG. 9 is a flowchart for describing the details of the process of Step S604.

In Step S901, the information extraction unit 207 selects one rule from the rule table acquired in Step S603. In Step S902, the information extraction unit 207 determines whether a character string length of a value in the selected rule is set to be fixed. When it is determined that the character string length of the value is set to be fixed, the process proceeds to a process of Step S904.

In Step S904, the information extraction unit 207 sets a priority for using the selected rule among the rules included in the rule table to be "high". Furthermore, in the selected rule, the information extraction unit 207 performs setting to estimate an area in which the value is written using the value condition. On the other hand, in Step S902, when the character string length of the value is not set to be fixed, the process proceeds to a process of Step S903.

In Step S903, the information extraction unit 207 determines whether the character type of the value is limited in the selected rule. In other words, the information extraction unit 207 determines whether the character string of the value is constituted of only a specific character type in the selected rule. Note that, after Step S901, the process may proceed to the process of Step S903 without performing the process of Step S902. Likewise, after Step S902, the process may proceed to a process of Step S906 without performing the process of Step S903.

In other words, in the embodiment, when the order of estimating the area is determined, the ease of the estimation of the area is determined depending on whether the character string of the value has a fixed length or whether the character type of the value is limited, but the present invention is not limited thereto. The ease of the estimation of the area is determined on the basis of the value from which the keyword or the value can be acquired, and any determination criterion may be used.

When it is determined that the character type of the value is limited, the process proceeds to a process of Step S905. In Step S905, the information extraction unit 207 sets a priority for using the selected rule among the rules included in the rule table to be "intermediate" and performs setting to estimate the area in which the value is written using the value condition in the selected rule.

On the other hand, in Step S903, when it is determined that the character type of the value is not limited, the process proceeds to the process of Step S906. In Step S906, the information extraction unit 207 sets a priority for using the selected rule among the rules included in the rule table to be "low" and performs setting to estimate the area in which the keyword is written using the keyword condition in the selected rule. Note that, in the embodiment, in the rule table, priorities of a rule used for estimating an area are set to three priority levels, i.e., "high", "intermediate", and "low" in descending order, but the present invention is not limited thereto.

In Step S907, the information extraction unit 207 determines whether the processes of Steps S901 to S906 have been performed for all the rules included in the rule table acquired in Step S603. When it is determined that the processes have been performed for all the rules, the process of FIG. 9, that is, the process of Step S604, ends and the process proceeds to a process of Step S605. On the other hand, when it is determined that the processes have not been performed for all the rules, the process returns to the process of Step S901.

FIG. 10 is a diagram showing a rule table when the process of Step S604 ends.

Information on an "in-rule estimation order" and an "in-table estimation order" is added to the rule table illustrated in FIG. 5. The "in-table estimation order" is information indicating a rule used to estimate an area in which information to be extracted is written among the rules included in the rule table.

Also, the "in-rule estimation order" is information indicating any of keyword and value conditions used to estimate an area in which information to be extracted is written in one rule included in the rule table. When there are a plurality of rules having the same "in-table estimation order," a rule with fewer characters written in the area to be estimated is prioritized. The number of characters written in the area to be estimated refers to the maximum value of characters of each keyword included in a "keyword" column in a case in which a value of the "in-rule estimation order" column is a keyword in one rule.

Also, when a value of the "in-rule estimation order" column is a value, the maximum value of characters is determined from a value of a "value character string length" column. For example, when a value of the "value character string length" column is "10 digits or less", the maximum value of characters is 10 digits. Furthermore, for example, when a value of the "value character string length" column is undefined, the maximum value of characters is undefined and can take any value. Thus, the number of characters written in the area to be estimated may be large. For this reason, the priority of the rule decreases.

Note that the priority of the rule when there are a plurality of rules having the same "in-table estimation order" is not limited to a method of determining the priority order in accordance with the number of characters written in the area to be estimated described above. For example, a rule in which a character type of characters written in the area to be estimated is limited may be prioritized. Furthermore, for example, a rule with fewer keywords registered in one rule may be prioritized. This is because determination can be performed at a higher speed when determination concerning whether the rule with fewer keywords coincides with the result of the character recognition processing is performed.

Description will return to FIG. 6. In Step S605, the information extraction unit 207 estimates a size of an area estimated by the rule in accordance with a priority order for using the rules included in the rule table determined in Step S604. In other words, the processes of Step S605 and subsequent to Step S605 are repeatedly performed for all the rules included in the rule table in an order from a rule with a higher priority in priorities for using the rules.

In order to estimate a size of an area, the maximum value and the minimum value of a predetermined character size and the maximum value and the minimum value of a margin between characters are used. For example, it is predetermined that the maximum value of a character size is 25 pixels and the minimum value thereof is 16 pixels, and the maximum value of the margin is 15 pixels and the minimum value thereof is 0 pixels. At this time, when the number of characters of the area to be estimated is 7, the minimum value of a size of the area is estimated to be 16 pixels in height and 112 pixels in width.

Specifically, when seven characters are arranged horizontally, a height is 16 pixels serving as the minimum value for one character, and a width is 16×7+0×6=112 serving as a value obtained by adding the minimum value for seven characters and the six minimum values of the margin. Likewise, the maximum value of the size of the area is estimated to be 25 pixels in height and 25×7+15×6=265 pixels in width.

Note that, in the embodiment, a size of an area is estimated assuming that characters are arranged in the horizontal direction, but a size of a separate area may be estimated even when the characters are arranged vertically. Furthermore, for example, a character string length of a value may be included in the rule table for each of full-width and half-width characters, and a size may be estimated by distinguishing between full-width and half-width characters when a size of an area is estimated. In this case, the maximum value and the minimum value of the size may be set in advance for each of the full-width and half-width characters.

In Step S606, the information extraction unit 207 specifies an area in which the size of the estimated area is satisfied based on the result of the area analysis processing in Step S602. To be specific, the width and the height of the rectangular area included in the area information table (FIG. 8) specify the rectangular area included in a range of a size of the area estimated in Step S605.

For example, when an area is estimated using Rule 3 in the rule table of FIG. 10, the maximum value of a size of the area to be estimated is 25 pixels in height and 265 pixels in width. Furthermore, the minimum value of a size of the area to be estimated is 18 pixels in height and 112 pixels in width. At this time, the rectangular areas of ID2, ID3, and ID13 among the rectangular areas included in the area information table are specified as areas included in ranges of the maximum value and the minimum value.

In Step S607, the information extraction unit 207 performs the character recognition processing on the area specified in Step S606. At this time, the character recognition processing limiting a character type is performed on the basis of the previously defined rule. For example, when an area is estimated using Rule 3 of the rule table of FIG. 10, since character recognition processing in which a character type is limited to numbers 0 to 9, "-" (hyphen), or letters "A", "B", and "C" is performed, the output result of the character recognition processing is also limited.

FIG. 11 is a diagram showing an area information table in a state in which the result of performing character recognition processing in Step S607 is included.

Specifically, FIG. 11 illustrates the area information table after the character recognition processing is performed on the rectangular area of ID2 in Step S607. In the area information table illustrated in FIG. 8, a value is added to the "character recognition result" column of the rectangular area of ID2. In other hand, the extraction of "1234-C56" serving as the result of performing the character recognition processing on the area of ID2 is illustrated.

Description will return to FIG. 6. In Step S608, the information extraction unit 207 specifies a paired area of areas from which information is extracted in Step S607 and performs the character recognition processing on the paired area. The paired area is an area in which a keyword is written when an area from which information is extracted in Step S607 is an area in which a value is written. Furthermore, the paired area is an area in which a value is written when an area from which information is extracted in Step S607 is an area in which a keyword is written.

For example, when an area is estimated using Rule 3 of the rule table of FIG. 10, since the in-rule estimation order is a "value", the area from which the information is extracted in Step S607 is an area in which the value is written. Here, in Rule 3, it is set that there is an area in which the value is written at the position of 20 pixels to the right when viewed from the area in which the keyword is written.

Thus, the "paired area" specified in Step S608 is an area located at the position of 20 pixels to the left when viewed from the area in which the value from which information is extracted in Step S607 is written. In FIGS. 7 and 8, since the paired area is specified to be a rectangular area of ID1, the information extraction unit 207 performs the character recognition processing on the rectangular area of ID1.

FIG. 12 is a diagram showing an area information table in a state in which the result of performing character recognition processing in Step S608 is included.

Specifically, FIG. 12 illustrates an area information table after the character recognition processing is performed on the rectangular area of ID1 in Step S608. In the area information table illustrated in FIG. 11, a value is added to the "character recognition result" column of the rectangular area of ID1. In other words, an area paired with the area of ID2 is the area of ID1, and the extraction of a "slip number" is illustrated as the result of performing the character recognition processing on the area of ID1.

Description will return to FIG. 6. In Step S609, the information extraction unit 207 determines whether the result of the character recognition processing coincides with the keyword of the corresponding rule of the rule table. For example, when an area is estimated using Rule 3 of the rule table of FIG. 10, the keywords are "Slip number", "Number", "Form number", or "File ID." The information extraction unit 207 determines whether the result of the character recognition processing in Step S608 coincides with any of the keywords.

Note that, in Step S604, when it is determined to estimate an area in which a keyword is written in advance, the process may proceed to the process of Step S609 without performing the character recognition processing of the paired area in Step S608. Moreover, in Step S609, a process of Step S608 may be performed only when it is determined that the keyword coincides with the result of performing the character recognition processing. In other words, when the area specified in Step S606 is not the area in which the keyword is written, since the paired area is not the area in which the value is written, the character recognition processing in Step S608 is unnecessary and can be omitted.

Also, when the information extraction unit 207 outputs a plurality of candidates as a result of the character recognition processing, it may be determined whether the keywords coincide with each other with respect to a plurality of output candidates. Furthermore, in the character recognition processing, there are cases in which extra characters are output due to an influence of noise or the like in the image or characters are erroneously recognized in some cases.

Thus, when it is determined whether the result of the character recognition processing coincides with the keyword of the rule in the rule table, the condition concerning whether the result thereof coincides with the key may be relaxed so that it is determined that the result thereof coincides with the keyword when 50% of the character string of the keyword is included in the character string of the result of the character recognition processing.

In Step S609, when the information extraction unit 207 determines that the result of the character recognition processing coincides with the keyword of the corresponding rule of the rule table, the area information table and the result of the character recognition processing stored in the area information table are stored in the storage 202. On the other words, in Step S609, when the information extraction unit 207 determines that the result of the character recognition processing does not coincide with the keyword of the corresponding rule of the rule table, the process returns to the process of Step S606.

Also, the information extraction unit 207 specifies an area in which the size of the area estimated in Step S605 is satisfied from the result of the area analysis processing in Step S602 except for an area which has already been subjected to the processes of Steps S606 to S609.

As described above, according to the embodiment, the character recognition processing is performed in an order from an area in which it is easy to estimate that it is an area in which information is described among the keyword and value conditions for extracting the information. Thus, from an image containing non-fixed information, an area in which a keyword is described is specified by performing the character recognition processing on the entire image and information can be extracted at a high speed more efficiently than extracting value information later.

Note that, in the embodiment, an area which is easy to be estimated as an area in which information is described is determined in accordance with the conditions of a character type and a character string length in the keyword and value conditions (rule) for extracting information. However, a criterion for determining whether the area is easy to be estimated as the area in which the information is described is not limited thereto. For example, whether values can be expressed in regular expressions or the like may be used as a criterion for determination.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-023558, filed Feb. 10, 2017, which is hereby incorporated by reference wherein in its entirety.

What is claimed is:

1. An information processing apparatus comprising:
a memory for storing a computer program; and a processor for executing the computer program to perform:

extracting areas from an image by performing area analysis processing on the image;

acquiring a rule that defines both of a keyword and conditions of a value corresponding to the keyword;

determining, based on the acquired rule, which of an area including the keyword and an area including the value should be first specified from among the extracted areas;

estimating, based on the keyword or the conditions of the value, a size of the determined area to be first specified;

first specifying the area including the keyword or the area including the value from among the extracted areas based on the estimated size;

performing character recognition process on the first specified area; and second specifying a paired area of the first specified area based on the acquired rule to perform character recognition process on the second specified area.

2. The information processing apparatus according to claim 1, wherein the processor executes the computer program to perform, if the rule defines that the value corresponding to the keyword is a character string with a fixed length, it is determined that the area including the value should be first specified.

3. The information processing apparatus according to claim 1, wherein the processor executes the computer program to perform, if the rule defines that the value corresponding to the keyword is limited to a specific character type, it is determined that the area including the value should be first specified.

4. The information processing apparatus according to claim 3, wherein, if the rule defines that the value corresponding to the keyword is limited to a specific character type, the character recognition process on the first specified area is performed limited to the specific character type.

5. The information processing apparatus according to claim 1, wherein the processor executes the computer program to perform, if there are a plurality of rules, determining an order of using the plurality of rules based on the keywords included in the rules and the conditions of the values corresponding to the keywords.

6. The information processing apparatus according to claim 5, wherein, if there are the plurality of rules, when specifying the area including the keyword and the area including the value corresponding to the keyword among the extracted areas using one of the rules, an area previously specified as the area including the keyword or the area including the value corresponding to the keyword using another rule is excluded from the extracted areas.

7. The information processing apparatus according to claim 1, wherein the rule includes information related to an arrangement of the area including the keyword and the area including the value corresponding to the keyword, and wherein the second specified area is specified based on the first specified area and the information related to the arrangement included in the rule.

8. A non-transitory storage medium on which is stored a computer program for making a computer execute a method for controlling an information processing apparatus, the method comprising:

extracting areas from an image by performing area analysis processing on the image;

acquiring a rule that defines both of a keyword and conditions of a value corresponding to the keyword;

determining, based on the acquired rule, which of an area including the keyword and an area including the value should be first specified from among the extracted areas;

estimating, based on the keyword or the conditions of the value, a size of the determined area to be first specified;

first specifying the area including the keyword or the area including the value from among the extracted areas based on the estimated size;

performing character recognition process on the first specified area; and second specifying a paired area of the first specified area based on the acquired rule to perform character recognition process on the second specified area.

9. A method for controlling an information processing apparatus, the method comprising:

extracting areas from an image by performing area analysis processing on the image;

acquiring a rule that defines both of a keyword and conditions of a value corresponding to the keyword;

determining, based on the acquired rule, which of an area including the keyword and an area including the value should be first specified from among the extracted areas;

estimating, based on the keyword or the conditions of the value, a size of the determined area to be first specified;

first specifying the area including the keyword or the area including the value from among the extracted areas based on the estimated size;

performing character recognition process on the first specified area; and second specifying a paired area of the first specified area based on the acquired rule to perform character recognition process on the second specified area.

* * * * *